United States Patent [19]

Kashiwagi et al.

[11] Patent Number: 5,751,285
[45] Date of Patent: May 12, 1998

[54] PARAMETER PROCESSING DEVICE FOR SETTING A PARAMETER VALUE USING A MOVABLE SLIDE OPERATOR AND INCLUDING MEANS FOR FINE-ADJUSTING THE PARAMETER VALUE

[75] Inventors: Kouichi Kashiwagi, Tenri; Toshiyuki Masui, Souraku-gun; George Rome Borden, Tenri, all of Japan

[73] Assignee: Sharp Kabushiki Kaisha, Osaka, Japan

[21] Appl. No.: 544,129

[22] Filed: Oct. 17, 1995

[30] Foreign Application Priority Data

Oct. 18, 1994 [JP] Japan .................................. 6-251809

[51] Int. Cl.$^6$ ........................................................ G06F 3/00
[52] U.S. Cl. .............................................. 345/349; 345/974
[58] Field of Search ................................... 395/349, 348, 395/326, 339, 974, 341, 973; 345/349, 348, 326, 339, 974, 341, 973

[56] References Cited

U.S. PATENT DOCUMENTS

| | | | |
|---|---|---|---|
| 4,896,291 | 1/1990 | Gest et al. | 345/353 |
| 5,265,246 | 11/1993 | Li et al. | 707/4 |
| 5,418,549 | 5/1995 | Anderson et al. | 345/145 |
| 5,491,781 | 2/1996 | Gasperina et al. | 345/341 |

OTHER PUBLICATIONS

"Min–Max Slider", IBM Technical Disclosure Bulletin, vol. 33, No. 3B, pp. 31–32, Aug. 1990.

"Hybrid Dial/Slider Icon", IBM Technical Disclosure Bulletin, vol. 33, No. 6A, pp. 326–327, Nov. 1990.

"Multiple–Range Slider", IBM Technical Disclosure Bulletin, vol. 35, No. 1A, pp. 198–199, Jun. 1992.

"The Alphaslider: A Compact and Rapid Selector", C. Ahlberg, B. Shneiderman, CHI'94 Conference Proceedings, pp. 365–371, 1994.

*Primary Examiner*—Matthew M. Kim
*Assistant Examiner*—Crescelle N. dela Torre
*Attorney, Agent, or Firm*—David G. Conlin; Brian L. Michaelis

[57] ABSTRACT

A parameter processing device that allows setting of a critical parameter value includes a movable slide operator on a scale of a predetermined length, and two fine-adjustment switches provided integral to the slide operator. In the operation of setting a parameter value, a rough parameter value is set by moving the slide operator. Then, one of the fine-adjustment switches is depressed to fine-adjust the set rough parameter value. Here, the level of the depressed pressure is detected by an internal pressure sensor. The detected level of the depressed pressure is converted into a corresponding fine-adjustment granularity. The rough parameter value is updated using the obtained fine-adjustment granularity. Thus, a fine parameter value can be set easily that could not previously be set by just moving the slide operator. The setting of a parameter having a wide range can easily be carried out even in a limited region.

8 Claims, 12 Drawing Sheets

FIG. 5

| SLIDE OPERATOR POSITION INFORMATION | PARAMETER VALUE |
|---|---|
| 0000000 | 0 |
| 0000000 | 20 |
| 0000001 | 40 |
| 0000001 | 60 |
| 0000010 | 80 |
| 0000010 | 100 |
| ⋮ | ⋮ |
| 1111111 | 5080 |
| 1111111 | 5100 |

FIG. 6A

| PRESSURE INFORMATION | POSITIVE FINE-ADJUSTMENT GRANULARITY |
|---|---|
| 0000000 | 0 |
| ⋮ | ⋮ |
| 0000011 | 0 |
| 0000100 | 1 |
| ⋮ | ⋮ |
| 0000111 | 1 |
| 0001000 | 2 |
| ⋮ | ⋮ |
| 0001011 | 2 |
| 0001100 | 3 |

FIG. 6B

| PRESSURE INFORMATION | NEGATIVE FINE-ADJUSTMENT GRANULARITY |
|---|---|
| 0000000 | 0 |
| ⋮ | ⋮ |
| 0000011 | 0 |
| 0000100 | −1 |
| ⋮ | ⋮ |
| 0000111 | −1 |
| 0001000 | −2 |
| ⋮ | ⋮ |
| 0001011 | −2 |
| 0001100 | −3 |

PARAMETER PROCESSING DEVICE FOR SETTING A PARAMETER VALUE USING A MOVABLE SLIDE OPERATOR AND INCLUDING MEANS FOR FINE-ADJUSTING THE PARAMETER VALUE

BACKGROUND OF THE INVENTION

1. Field of the Invention

The present invention relates to a parameter processing device used for setting or selecting a parameter value having a wide range, and a parameter processing device, implemented on a computer system, used for setting a parameter value having a wide range.

2. Description of the Background Art

A parameter input device such as slide volume and a parameter input function referred to as a slider, implemented as a software on a computer system, are known as devices for setting a parameter value. These parameter input devices and slider each include a scale and a slide operator traversing on the scale to set a parameter value by correlating the position information of the slide operator on a scale with a parameter value.

In the devices, a parameter value having a small range can easily be set. However, accurate setting of a parameter value having a wide range requires experience and skill since fine adjustment is difficult. The operation thereof was time consuming.

In a slider that is realized as a software on a computer system, there was a problem that the range of parameter that can be set with a unitary slider is limited due to the degree of resolution in a display device.

To solve this problem, various methods have been proposed such as (1) preparing a plurality of parameter input devices or sliders, each with different set values, (2) providing a switch for changing the granularity in addition to the unitary parameter input device or slider, and (3) detecting the speed of a mobile element on the scale to vary the parameter value according to a granularity on the basis of the detected speed. In Japanese Patent Laying-Open No. 5-266145, a slider realized by a software on a computer system is disclosed in which a button set with a predetermined granularity is prepared for varying the parameter value using this button. A typical method is to vary the parameter value using such a button provided at either end of a slide operator or a scale.

However, provision of a plurality of parameter input devices or sliders each with different set granularity is expensive. Furthermore, implementation is difficult when there is spatial limitation.

The method of (2) supplying a switch for changing the granularity in addition to a unitary parameter input device or slider necessiates frequent switching of the set granularity. Therefore, the time efficiency is degraded.

In the method of detecting a speed of a mobile element on a scale to set a parameter value according to a granularity on the basis of the detected speed, the slide operator must be moved very slowly when fine adjustment is needed. This requires experience and skill of the operator. Therefore, the operability is poor.

In the method of preparing a button with a predetermined granularity assigned in a slider implemented by a software on a computer system, the granularity allotted to the button is fixed. This means that a great number of granularities must be prepared when the range of the parameter is increased. Efficient specification of a parameter value cannot be carried out easily. Furthermore, implementation was difficult when there is spatial limitation.

SUMMARY OF THE INVENTION

An object of the present invention is to provide a parameter processing device that can fine-adjust a parameter value efficiently having a wide range using a single slider in a parameter processing device implemented as a hardware such as a slide volume or as a software on computer system.

To achieve the above object, a parameter processing device according to the present invention includes a scale of a predetermined length and a slide operator movable on the scale for sequentially entering and providing a parameter value to be adjusted. In entering a parameter value, the position information of the slide operator on the scale is detected to be converted into a corresponding parameter value, and fine-adjustment information entered for fine-adjusting that parameter value is converted into a corresponding fine-adjustment granularity of the parameter value, whereby the parameter value obtained by conversion is fine-adjusted and updated using the fine-adjustment granularity obtained by conversion. As a result, fine setting of a parameter value that could not be set only by moving the slide operator on the scale is feasible. Therefore, a parameter value having a wide range can easily be set even in a limited region.

By establishing the level of depressed pressure towards first and second switches provided at the slide operator as the aforementioned fine-adjustment information, the user can set a parameter value while adjusting the value thereof according to the level of the depressed pressure on the switches. As a result, the user can set critical parameter values intuitively and rapidly.

By establishing information specifying the distance from the position of the slide operator on the scale as the aforementioned fine-adjustment information, the user can set a parameter value while adjusting the value thereof by just entering a position specifying the distance on the scale. As a result, the user can set critical parameter values intuitively and rapidly.

When the scale of a predetermined length and the slide operator are displayed on the display unit in the parameter processing device, the entered specified position information of the slide operator on the scale is detected to be converted into a corresponding parameter value. Also, the entered fine-adjustment information on the scale is detected to be converted into a corresponding fine-adjustment granularity. The parameter value obtained by conversion is adjusted and updated using the fine-adjustment granularity obtained by conversion. As a result, a critical parameter value that could not be set just by moving a slide operator and a parameter value that has a wide range can easily be set in real time even in the case where the display region of a display unit is limited as in a portable information processor terminal.

In the parameter processing device, the fine-adjustment granularity of a parameter value is increased in proportion to the level of the depressed pressure and the distance from the slide operator. Therefore, the user can set a critical parameter value intuitively and rapidly.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a portion of the contents of a conversion table for converting position information of a slide operator on a scale into a parameter value according to the first embodiment of the present invention.

FIGS. 6A and 6B show a portion of the contents of fine-adjustment tables for converting pressure information into fine-adjustment granularity according to the first embodiment of the present invention.

DESCRIPTION OF THE PREFERRED EMBODIMENTS

Embodiments of the present invention will be described hereinafter with reference to the drawings.

First Embodiment

The first embodiment of the present invention is implemented using pressure information as the fine-adjustment information with a pressure sensor for a fine-adjustment input unit.

Figure 1:
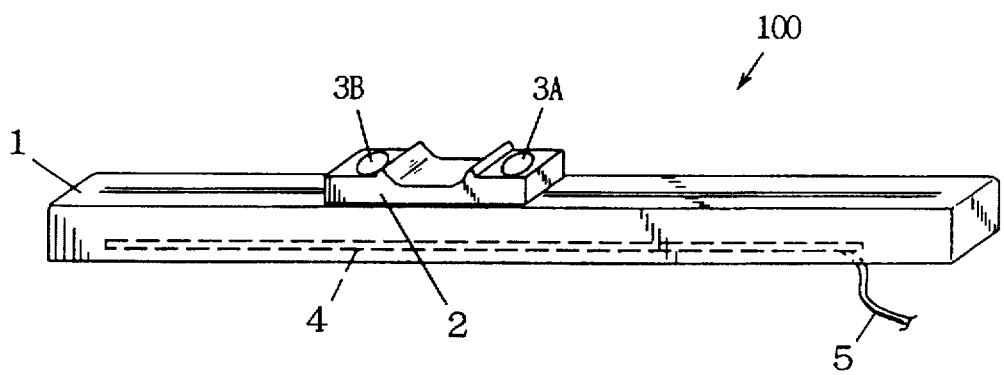
FIG. 1 shows an outer appearance of a parameter processing device in which a fine slider is implemented as a hardware according to a first embodiment of the present invention.

Referring to FIG. 1, a parameter processing device 100 includes a scale 1 with a slide resistor element, fine-adjustment switches 3A and 3B as pressure sensors on scale 1, a control base 4 provided within scale 1, and an interface cable 5 for establishing electrical contact between parameter processing device 100 and another device. Fine-adjustment switches 3A and 3B carry out fine-adjustment of a positive amount and a negative amount, respectively, with respect to a parameter value corresponding to the position of operator 2 on scale 1.

Figure 2:
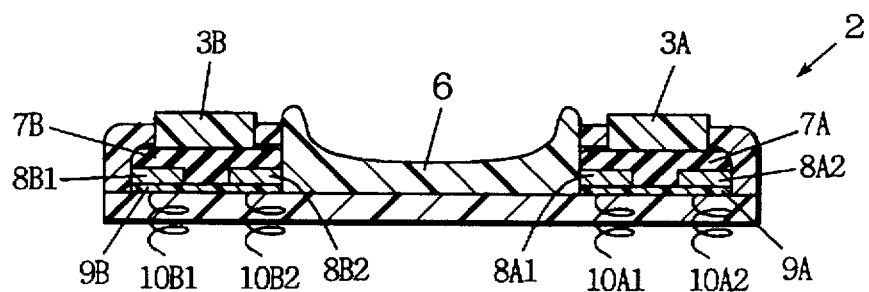
FIG. 2 is a sectional view of the slide operator of FIG. 1.

Referring to FIG. 2, printed substrates 9A and 9B and a slide knob 6 are provided on the substrate (the portion in direct contact with the upper plane of scale 1) of slide operator 2. Pressure sensitive resistors of rubber 7A and 7B which are pressure sensors are provided on each main surface of printed substrates 9A and 9B, respectively. Furthermore, electrodes 8A1 and 8A2 and electrodes 8B1 and 8B2 are provided on each main surface of print substrates 9A and 9B, respectively, so as to be in contact with respective pressure sensitive resistors of rubber 7A and 7B. Wirings 10A1 and 10A2 are provided with respect to printed substrate 10A. Similarly, wirings 10B1 and 10B2 are provided with respect to printed substrate 9B. Wirings 10A1 and 10A2 are connected to electrodes 8A1 and 8A2, respectively. Wirings 10B1 and 10B2 are connected to electrodes 8B1 and 8B2, respectively. Each wiring is provided to detect the voltage of a corresponding electrode.

In slide operator 2, depressed pressure exerted on fine-adjustment switches 3A and 3B is conveyed to pressure sensitive resistors of rubber 7A and 7B, respectively. Each pressure sensitive resistors 7A and 7B has its resistance varied according to the level of the transmitted depressed pressure. The voltage of each of electrodes 8A1 and 8A2 and electrodes 8B1 and 8B2 is altered according to the amount of change in the resistance.

Figure 3:
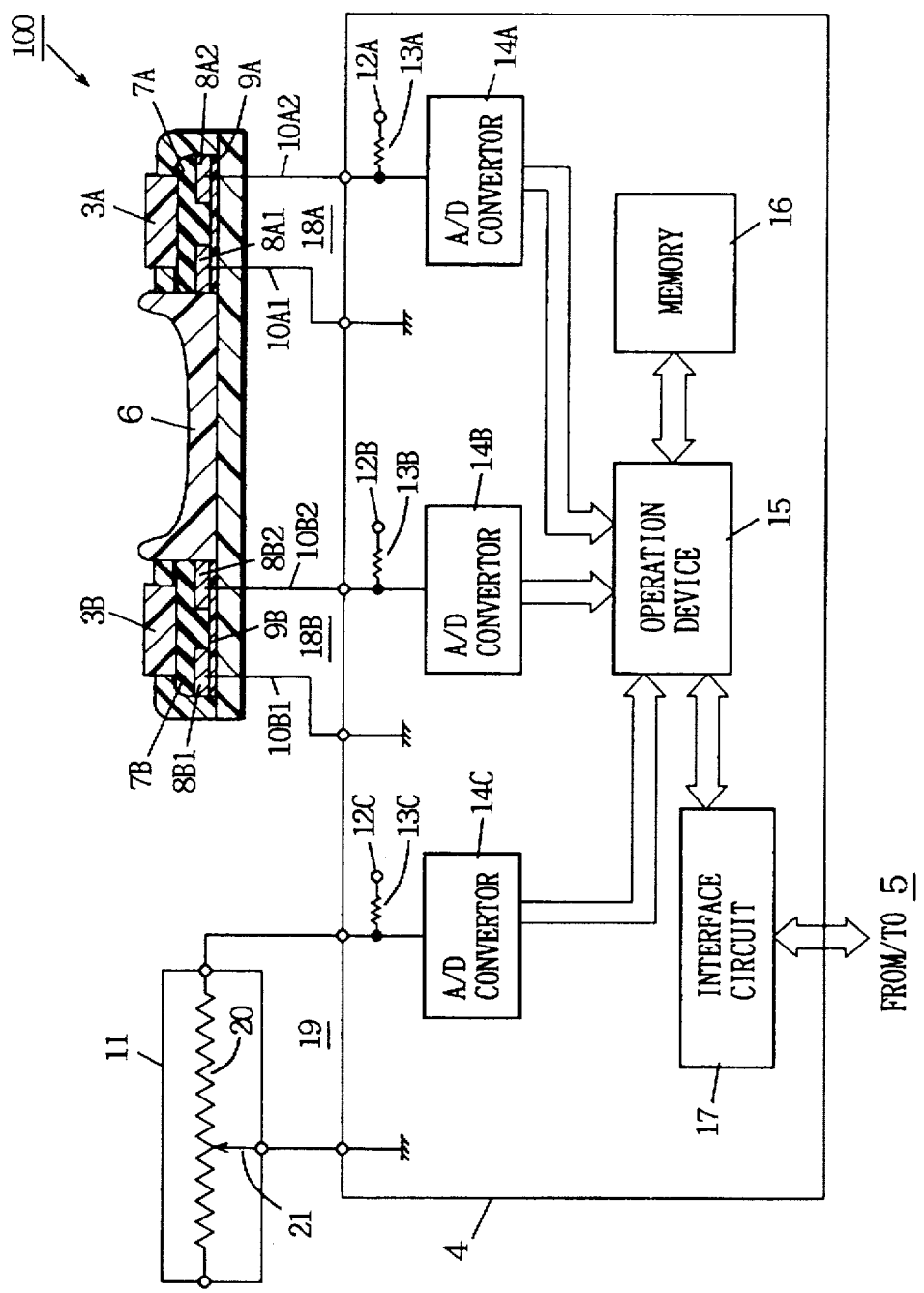
FIG. 3 is an internal block diagram of the parameter processing device of FIG. 1.

Referring to FIG. 3, parameter processing device 100 further includes a slide resistor element 11, depressed pressure detection units 18A and 18B, and a slide operator position detection unit 19. Control base 4 is connected to slide resistor element 11 having its resistance varied according to the travel of slide operator 2 on scale 1. Control base 4 includes A/D (analogue/digital) converters 14A, 14B and 14C, an operation device 15, a memory 16, and an interface circuit 17 for providing connection with an external display device or an input/output device.

Depressed pressure detection unit 18A includes pressure sensitive resistor 7A, electrodes 8A1, 8A2, printed substrate 9A and a resistor 13A to detect the depressed pressure towards fine-adjustment switch 3A as a voltage. Resistor 13A has one end 12A supplied with power supply voltage, and the other end connected to A/D converter 14A and to electrode 8A2. Electrode 8A1 is connected to the ground side.

In depressed pressure detection unit 18A, the depressed pressure towards fine-adjustment switch 3A is transmitted to pressure sensitive resistor of rubber 7A, whereby the resistance value of pressure sensitive resistor 7A is altered according to the distortion generated by the depressed pressure. A voltage responsive to the resistance is applied across electrodes 8A2 and 8A1. A/D converter 14A receives this voltage to convert the voltage value detected by depressed pressure detection unit 18A into a digital signal of 8 bits, for example, in binary. This digital signal is provided to operation device 15 as pressure information.

Similarly, depressed pressure detection unit 18B includes pressure sensitive resistor of rubber 7A, electrodes 8B1 and 8B2, printed substrate 9B and a resistor 13B to detect the depressed pressure towards fine-adjustment switch 3B as a voltage. Resistor 13B has one end 12B supplied with the power supply voltage, and the other end connected to A/D converter 14B and to electrode 8B2. Electrode 8B1 is connected to the ground side.

In depressed pressure detection unit 18B, the depressed pressure towards fine-adjustment switch 3B is transmitted to pressure sensitive resistor of rubber 7B, whereby the resistance value thereof is altered according to the distortion generated by the depressed pressure. A voltage responsive to the resistance is applied across electrodes 8B2 and 8B1. A/D converter 10B receives this voltage to convert the voltage value detected by depressed pressure detection unit 18B into a digital signal of 8 bits, for example, in binary. The digital signal is provided to operation device 15 as pressure information.

Slide resistor element 11 includes a resistor member 20, and a terminal 21 moving on resistor member 20 in cooperation with slide operator 2. The resistance across one end of resistor member 20 and terminal 21 varies in response to terminal 21 traversing on resistor member 20.

Slide operator position detection unit 19 includes slide resistor element 11 and a resistor 13C to detect the position of slide operator 2 on scale 1 as a voltage. Resistor 13C has one end 12C supplied with the power supply voltage, and other end connected to A/D converter 14C and to one end of resistor member 20 in slide resistor element 11. Resistor member 20 has the other end opened, and terminal 21 is connected to the ground side. The sliding movement of slide operator 2 on scale 1 causes a change in the resistance value across one end of resistor member 20 connected to resistor 13 and terminal 21 in slide operator position detection unit 19. A/D converter 14C receives a corresponding voltage. A/D converter 14C converts the voltage value detected by slide operator position detection unit 19 into a digital signal of 8 bits, for example, in binary. The digital signal is provided to operator device 15 as slide operator position information.

Operation device 15 is formed of a CPU (Central Processing Unit) to receive the converted digital signals from A/D converters 14A, 14B and 14C as fine-adjustment information (pressure information) and slide operator position information. Operation device 15 carries out operation for fine-adjusting the parameter value and controls the device entirely while communicating with memory 16 or interface circuit 17.

Figure 4:
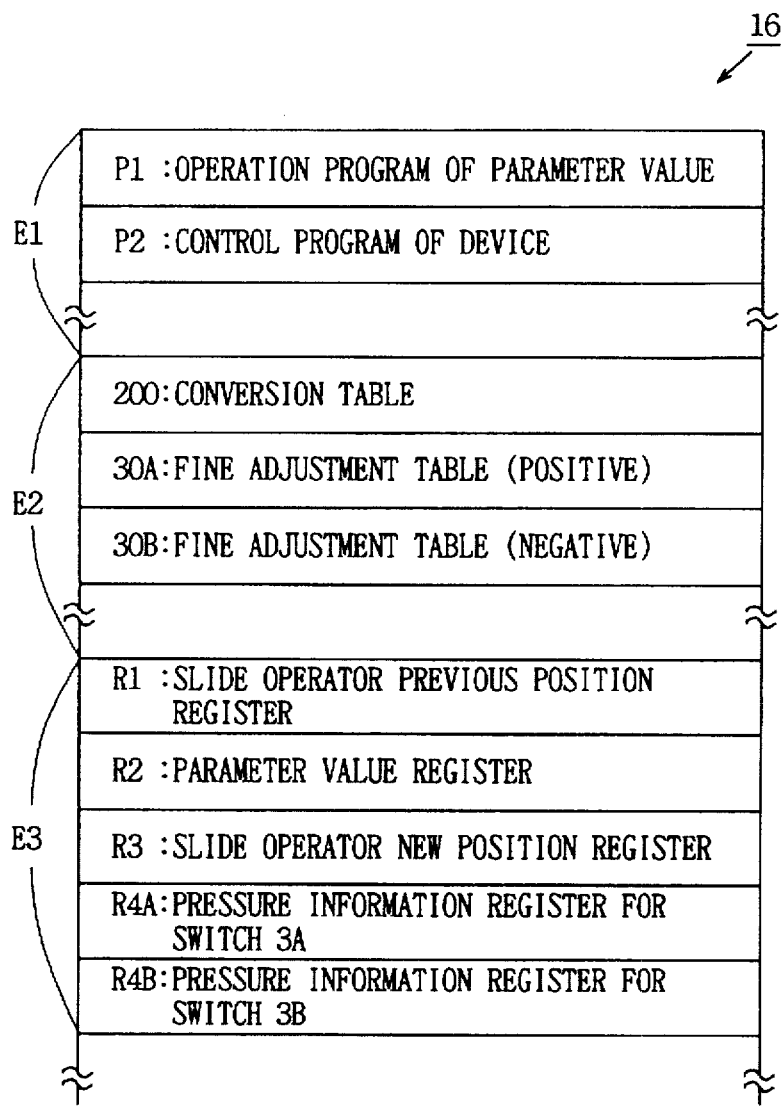
FIG. 4 shows a portion of the stored contents of the memory of FIG. 3.

FIG. 4 shows a portion of the stored contents of memory 16 shown in FIG. 3.

Referring to FIG. 4, memory 16 includes an RAM (Random Access Memory), an ROM (Read Only Memory), and a hard disk. As shown in FIG. 4, the storage region of memory 16 includes a program region E1, a table region E2, and a register region E3. An operation program P1 associated with fine-adjustment of a parameter value and a control program P2 for the device are stored in program region E1. A conversion table 200 described afterwards and fine-adjustment tables 30A and 30B are stored in table region E2. Register region E3 is the working region for various registers such as a slide operator previous position register R1 for storing the previous detected position information of slide operator 2, a parameter value register R2 for storing a parameter value corresponding to the current detected position information of slide operator 2, a slide operator new position register R3 for storing the currently detected position information of slide operator 2, a pressure information register R4A for fine-adjustment switch 3A, and a pressure information register R4B for fine-adjustment switch 3B. Pressure information registers R4A and R4B store pressure information indicating the level of the depressed pressure exerted on fine-adjustment switches 3A and 3B, respectively.

Interface circuit 17 communicates with an external device that requires fine-adjustment of a parameter via interface cable 5. Interface circuit 17 provides an operated or set parameter value in real time, and receives input information provided from an external input device regarding modification of conversion table 200 or fine-adjustment tables 30A and 30B.

Referring to FIG. 5, a plurality of parameter values 202 corresponding to a plurality of different slide operator position information 201 are stored in conversion table 200.

Fine-adjustment table (positive) 30A of FIG. 6A serves to convert pressure information from fine-adjustment switch 3A into a positive fine-adjustment granularity. A plurality of positive fine-adjustment granularities 50A corresponding to the plurality of pressure information 40A are stored therein.

Fine-adjustment table (negative) 30B of FIG. 6D serves to convert the pressure information from fine-adjustment switch 3B into a negative fine-adjustment granularity. A plurality of negative fine-adjustment granularities 50 corresponding to the plurality of pressure information 40B are stored therein.

The present invention is not limited to the present embodiment where fine-adjustment switch 3A carries out a positive fine-adjustment and fine-adjustment switch 3B carries out a negative fine-adjustment. One of switches 3A and 3B can be assigned to carry out a positive fine-adjustment, and the other assigned to carry out a negative fine-adjustment.

Figure 7:
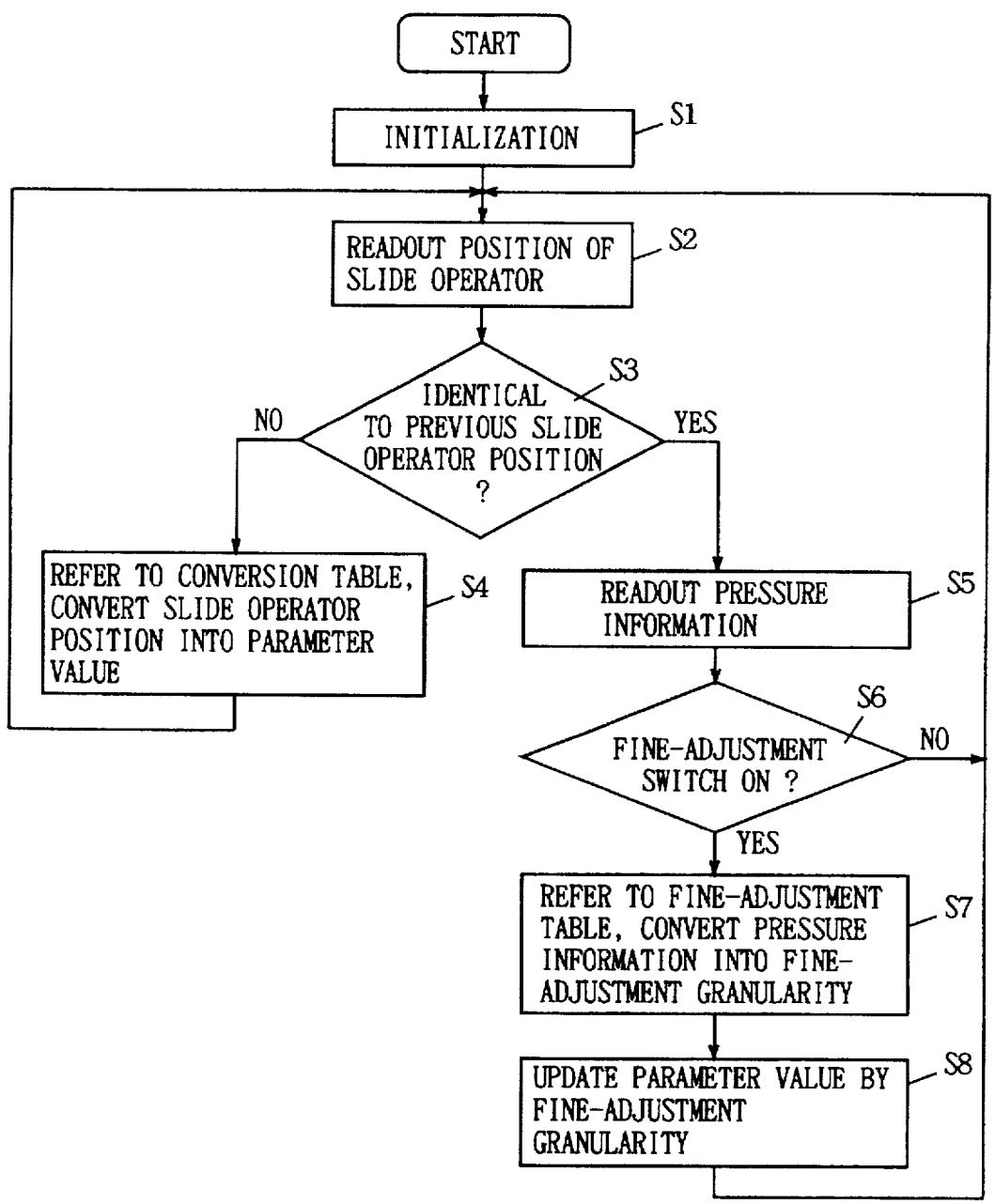
FIG. 7 is a flow chart for describing a method of setting a parameter according to the first embodiment of the present invention.

The flow chart of FIG. 7 is carried out under the control of the CPU of the operation device 15 stored in memory 16 as a program.

At step S1, initialization is carried out. In the initialization process, operation device 15 reads out the slide operator position information converted into a digital signal by A/D converter 14C. This readout information is stored into slide operator previous position register R1 of memory 16. Operation device 15 refers to conversion table 200 and stores a parameter value obtained by converting the readout slide operator position information into a corresponding parameter value into parameter value register R2 of memory 16. During this initialization process, the contents of registers R4A and R4B are also initialized to be set to, for example, value 0.

At step S2, operation device 15 reads out again slide operator position information converted into a digital signal by A/D converter 14C, and stores the readout digital signal into slide operator new position register R3 in memory 16.

At step S3, operation device 15 compares the content of slide operator previous position register R1 with that of slide operator new position register R3. When the current position of the slide operator is not identical to that the previous position of the slide operator as a result of the comparison, i.e., the content of slide operator previous position register R1 does not match that of slide operator new position register R3, the control proceeds to step S4. At step S4, operation device 15 refers to conversion table 200 shown in FIG. 5 to convert the slide operator position information in slide operator new position register R1 into a corresponding parameter value. This parameter value is stored into parameter value register R2 to update the contents thereof. Then, the content of slide operator new position register R1 is stored into slide operator previous position register R3 to update the content thereof.

When the current position of the slide operator is identical to that of the previous one at step S3, the control proceeds to step S5 since there is a possibility that a depressed pressure is exerted on fine-adjustment switch 3A or 3B. At step S5, operation device 15 reads out pressure information converted into respective digital signals by A/D converters 14A and 14B. The readout signals are stored in pressure information registers R4A and R4B, respectively, in memory 16.

At step S6, determination is made whether the contents of pressure information registers R4A and R4B are those when depressed pressure is exerted on fine-adjustment switch 3A or 3B. When determination is made that no depressed pressure is acted on fine-adjustments switches 3A and 3B, the control returns to step S2.

When determination is made that depressed pressure is exerted on fine-adjustment switch 3A or 3B, the control proceeds to step S7 where fine-adjustment tables 30A and 30B are referred to. Each pressure information in pressure information registers R4A and R4B is converted into fine-adjustment granularities 50A and 50B.

As to the ON/OFF of fine-adjustment switch in step S6, determination is made that the switch is ON when the readout pressure information exceeds a certain threshold value. The threshold value is set taking into consideration noise on mounting and the idle shift of the switch. In the strictest sense, tables 30A and 30B shown in FIGS. 6A and 6B have the pressure information 40A and 40B shifted by respective threshold values. For the sake of convenience in the description, this threshold value is not taken into account in the contents of tables 30A and 30B.

In converting pressure information into fine-adjustment granularity at the above-described step S7, the depressed pressure information of switches 3A and 3B are converted into fine-adjustment granularities using corresponding fine-adjustment tables.

At step S8, a parameter value is read out from parameter value register R2 according to slide operator 2 to which fine-adjustment granularities 50A and 50B obtained at step S7 are added. As a result, the parameter value is updated. More specifically, the readout parameter value has the difference between the absolute values of fine-adjustment granularities 50A and 50B added to be updated, whereby the parameter value is adjusted and updated by a fine-adjustment granularity corresponding to the fine-adjustment switch with a greater depressed pressure. Then, the control returns to step S2.

Each pitch width of fine-adjustment granularities 50A and 50B respective in fine-adjustment tables 30A and 30B, respectively, shown in FIGS. 6A and 6B, is smaller than the pitch width of parameter value 202 in conversion table 200.

Therefore, a critical parameter values that cannot be set only by traversing slide operator 2 can be set by a fine-adjustment granularity according to a pressure level.

Since the updated parameter value is provided to an external output device or display device in real time by interface circuit 17 to be output or displayed, the user can adjust and set the parameter value to an intended value by exerting depressed pressure on fine-adjustment switch 3A or 3B while referring to the current output or displayed parameter value.

The present invention is not limited to the embodiment shown in FIG. 1 in which device 100 has fine-adjustment switches 3A and 3B provided at either end on slide operator 2 to detect the depressed pressure on the fine-adjustment switch in order to fine-adjust a parameter value. Alternatively, slide operators for fine-adjustment can be provided at either end of the main body of slide operator 2 and detect the travel distance of the fine-adjustment slide operator from the main body of slide operator 2 on the scale. The fine-adjustment slide operators can move from one end of the main body of slide operator 2 on the scale in one direction to one end of the scale. The fine-adjustment slide operators move together with the main body of the slide operator when moved. When this method is employed, the travel distance information of each fine-adjustment slide operator to the main body of the slide operator is converted into a fine-adjustment granularity according to the fine-adjustment table.

Figure 8A:
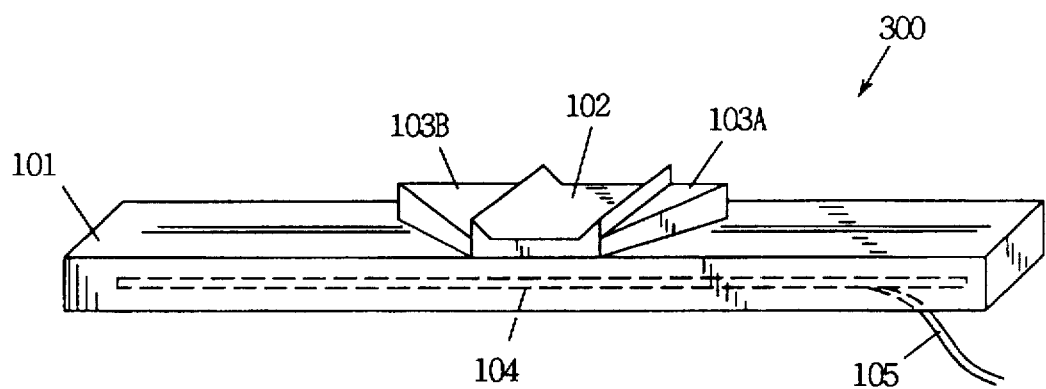
FIGS. 8A and 8B show the outer appearance of a parameter processing device having a fine-adjustment slider substituted for the fine-adjustment switch of FIG. 1.
Figure 8B:
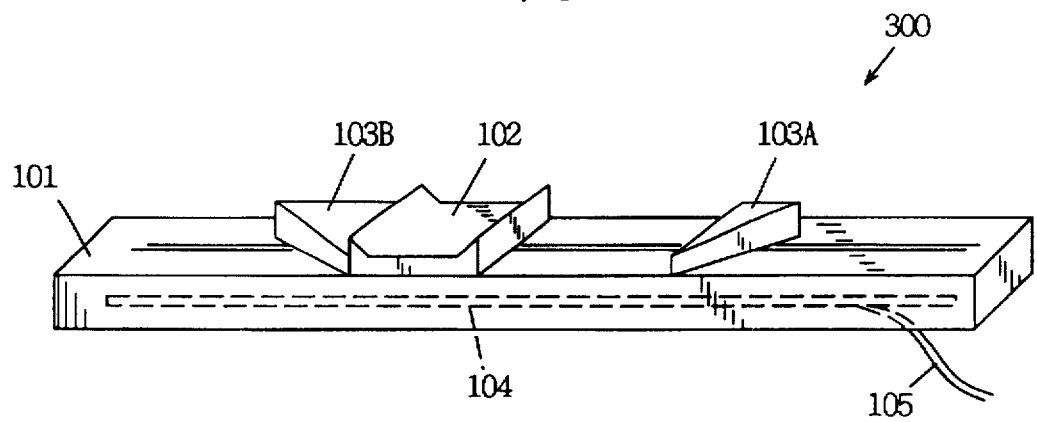

FIGS. 8A and 8B show the outer appearance of a parameter processing device having the fine-adjustment switch of FIG. 1 substituted with a fine-adjustment slider. Fine-adjustment by parameter processing device 300 is carried out in a manner similar to that of parameter processing device 100.

Referring to FIGS. 8A and 8B, parameter processing device 300 includes a scale 101 similar to that of FIG. 1, a slide operator 102 provided on scale 101 similar to that of FIG. 1, fine-adjustment slide operators 103A and 103B provided at respective ends of slide operator 102 in the longitudinal direction of scale 101 of slide operator 102, a control base 104, and an interface cable 105 to provide electrical connection between parameter processing device 300 and another device.

Similar to slide operator 2, slide operator 102 is used for rough setting of a parameter value. When slide operator 102 is operated to move on scale 101, fine-adjustment slide operators 103A and 103B move integrally with slide operator 102 as shown in FIG. 8A. When fine-adjustment of a parameter value is carried out by operation of fine-adjustment slide operator 103A or 103B, slide operator 103A or 103B is manually moved on scale 101 to depart from slide operator 102. The parameter value can be fine-adjusted by an amount according to the distance between slide operator 103A or 103B and slide operator 102. When fine-adjustment of a parameter is completed, the user withdraws his or her hand from slide operator 103A or 103B. Slide operator 103A or 103B returns to its former position on scale 101 (refer to FIG. 8A). The return of fine-adjustment slide operator 103A or 103B to its former position can easily be realized by connecting respective slide operators with slide operator 102 by means of an elastic solid such as a spring or rubber.

The distance between slide operator 102 and fine-adjustment slide operator 103A or 103B can be detected on the basis of a resistance value for each of operators 103A and 103B using a resistor member such as slide resistor 20 shown in FIG. 3. Alternatively, the distance can be detected using an element that converts the level of extension of an elastic solid such as a spring or rubber that connects fine-adjustment slide operator with slide operator 102 into a resistance value.

In the above-described devices 100 and 300, a parameter value is operated by operation device 15. Alternatively, a structure may be employed where a digital signal from A/D converters 14A, 14B and 14C is provided to an external device of a computer system via interface circuit 17 to carry out the operation of fine-adjusting the parameter value in the external device.

Second Embodiment

In the second embodiment, a parameter processing device of the present invention is realized on a computer system. In the parameter processing device of the present embodiment, a parameter value of a wide range can easily be set even in a restricted display region such as a display unit in a portable information terminal device.

Figure 9:
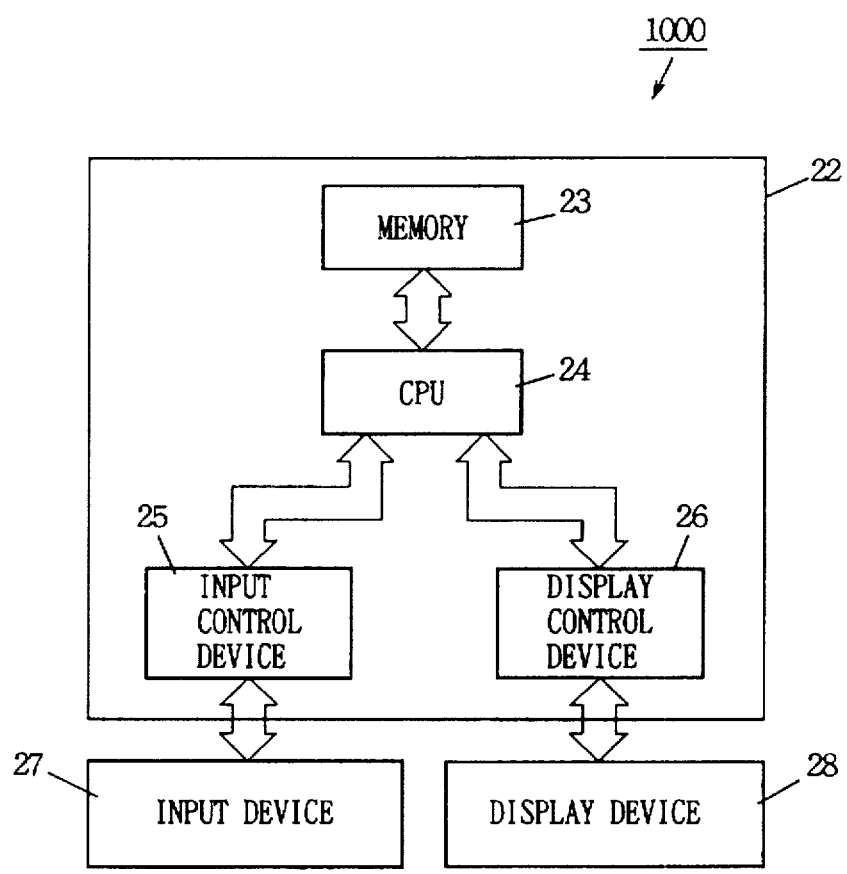
FIG. 9 is a block diagram showing a structure of a parameter processing device on a computer system according to a second embodiment of the present invention.

Referring to FIG. 9, a parameter processing device 1000 includes a computer 22, an input device 27 with a keyboard, a mouse, a pen, or the like, and a display device 28. Computer 22 includes a memory 23, a CPU 24, an input control device 25 for controlling input device 27, and a display control device 26 for controlling display device 28. Memory 23 is formed of a RAM, a ROM, or a hard disk.

Figure 10:
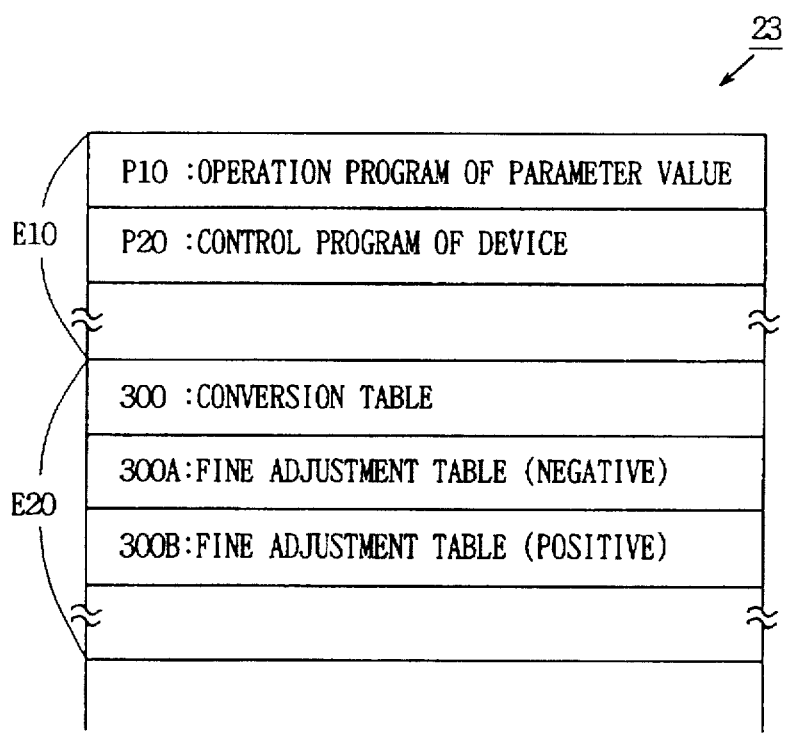
FIG. 10 shows a portion of the stored contents of the memory of FIG. 9.

FIG. 10 shows a portion of the stored contents in memory 23 of FIG. 9. The storage region of memory 23 includes a program region E10 and a table region E20. An operation program P10 associated with fine-adjustment of a parameter value, and a device control program P20 are stored in program region E10. Table region E20 includes a conversion table 300 described afterwards, a fine-adjustment table (negative) 300A storing negative fine-adjustment granularities, and a fine-adjustment table (positive) 30B storing positive fine-adjustment granularity.

CPU 24 executes control program P20 stored in memory 23 to control input control device 25, display control device 26, and memory 23 respectively. CPU 24 also executes operation program P10 to carry out operation of a parameter value. Input control device 25 controls input device 27 to transmit coordinate information and command information entered by a mouse or a pen of input device 27 to CPU 24. Display control device 26 controls display device 28, whereby image information transmitted from CPU 24 is displayed on display device 28 as display data.

Input control device 25 and input device 27 include a coordinate detection unit not shown to read out coordinate information. The coordinate detection unit is formed of a tablet having a plurality of electrodes arranged in a matrix corresponding to the plurality of coordinates of a cursor displayed on display device 28 to detect the coordinate by capacitive coupling. Alternatively, the coordinate detection unit can be realized by a display-integrated tablet where the function of the input control device 25 and input device 27 are made integral with the function of display control device 26 and display device 28 to provide a display period and a coordinate detection period in a time-divisional manner (details disclosed in Japanese Patent Laying-Open No. 5-537261, for example). Such a version having the coordinate detection function integral with the display function is suitable for a portable type information processor terminal device. Furthermore, coordinate information can be input through a mouse or the like by monitoring the cursor displayed on display device 28.

The input operation of coordinate information in FIG. 9 can be carried out by means of key input via the keyboard. Alternatively, the cursor displayed on display device 28 can be moved to a desired position using a mouse, a pen or a track ball, or a cursor key (pointing key) in a keyboard of input device 27, followed by depression of a button included in a mouse or pen, or a return key of the keyboard. Thus, coordinate information of the position of the cursor on display device 28 can be input. Furthermore, the coordinate can be specified by the tip of a pen or a finger of the user if a touch sensor is provided in display device 28.

When coordinate information is input, input control device 28 provides to CPU 24 an interruption signal termed an event corresponding to respective input operations. In response, CPU 24 carries a process corresponding to the applied event. When the input operation is directed to entry of coordinate information, input control device 25 provides a pointing event and display control device 26 provides a cursor position to CPU 24. Then, CPU 24 carries out a predetermined process according to the applied cursor position. Thus, parameter setting in parameter processing device 1000 of the present embodiment is carried out on the basis of a pointing event.

Figure 13A:
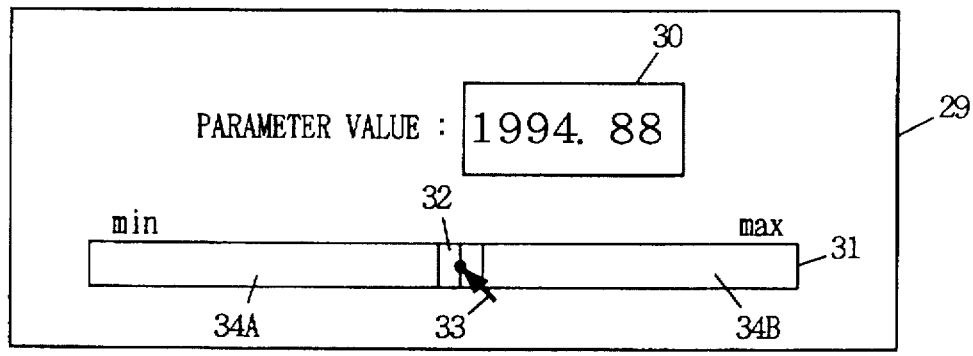
FIGS. 13A, 13B, and 13C show examples of an image display on a display device in entering a parameter according to the second embodiment of the present invention.
Figure 13B:
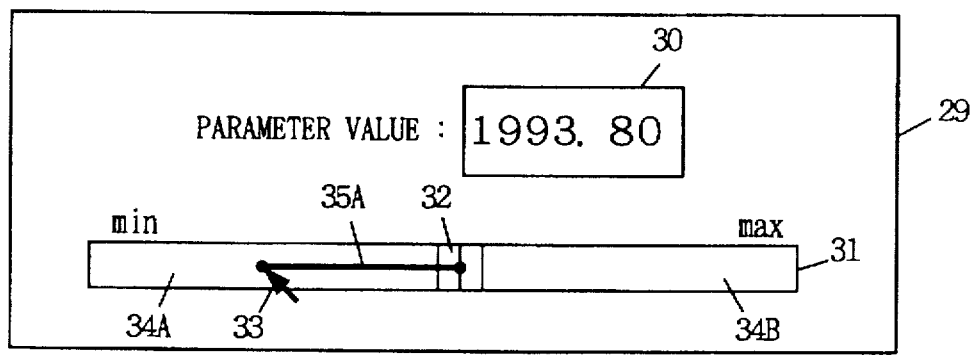
Figure 13C:
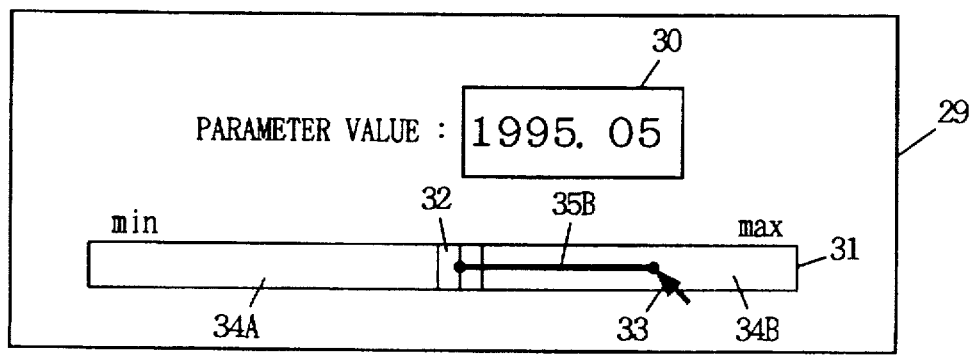

FIGS. 13A–13C show examples of image display on display device 28 in setting a parameter according to the second embodiment of the present invention. A parameter input unit 29 is provided in the display screen of display device 28. A parameter value display 30 for displaying a parameter value is provided in parameter input unit 29.

Parameter input unit 29 also shows a slide operator 32 and a scale 31 of a predetermined length which is the moving region of slide operator 32. Slide operator 32 on scale 31 does not appear in fine-adjustment regions 34A and 34B. Regions 34A and 34B correspond to the region between slide operator 32 on scale 31 and one end of scale 31 in the longitudinal direction, and the region between slide operator 32 on scale 31 and the other end in the longitudinal direction of scale 31. Cursor 33 moves within the screen in cooperation with the operation of a mouse, a pen, or a cursor key on the keyboard of input device 27.

The setting of a parameter value is carried out by a combination of a rough value setting operation by moving slide operator 32 on scale 31 and a fine-adjustment operation by specifying the position with cursor 33 in one of fine-adjustment regions 34A and 34B. This operation will be described in detail hereinafter.

A plurality of parameter values 302 corresponding to a plurality of different slide operator position information 301 indicating the relative position of slide operator 32 on scale 31 are stored in conversion table 300.

Figure 12A:
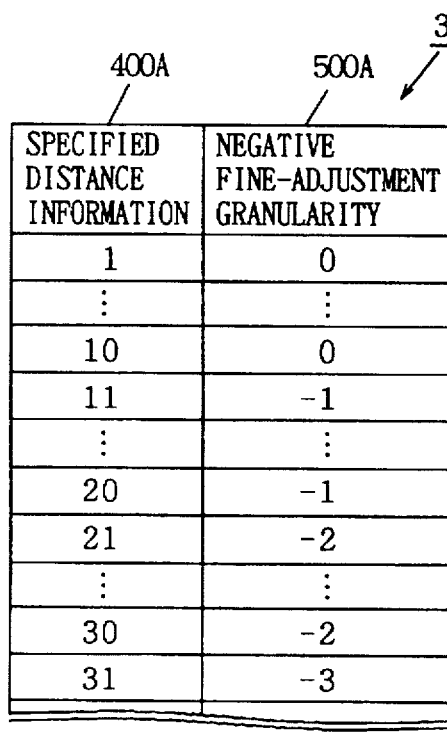
FIGS. 12A and 12B show fine-adjustment tables for converting specified distance information into fine-adjustment granularity according to the second embodiment of the present invention.

Fine-adjustment table (negative) 300A shown in FIG. 12A is used to convert the specified distance information of the coordinates of the position of slide operator 32 on scale 31 and the specified coordinates by cursor 33 in fine-adjustment region 34A into a negative fine-adjustment granularity. A plurality of negative fine-adjustment granularities 500A corresponding to the plurality of different specified distance information 400A are stored in fine-adjustment table (negative) 300A.

Figure 12B:
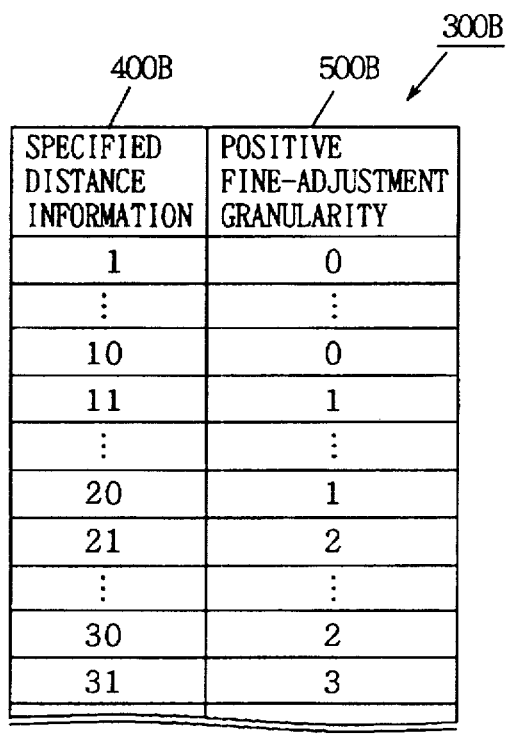

Fine-adjustment table (positive) 300B of FIG. 12B is used to convert the specified distance information of the coordinates of the position of slide operator 32 on scale 31 and the specified coordinates by cursor 33 in fine-adjustment region 34B. A plurality of positive fine-adjustment granularities 500B corresponding to each of the plurality of different specified distance information 400B are stored in fine-adjustment table 300B.

Operation of setting a rough value of the parameter is described hereinafter with reference to FIG. 13A. When a pointing event is generated in response to the user depressing a button on a mouse or a pen or a return key in a keyboard when cursor 33 is located on slide operator 32, the traverse of cursor 33 on scale 31 using a mouse, a pen, or a cursor key on the keyboard during the generation of a pointing event, i.e., during the depression of the button of the mouse or pen, or the return key of the keyboard, causes slide operator 32 to move following cursor 33. Display control device 26 detects the coordinates of slide operator 32 in display device 28 to provide the same to CPU 24. In response, CPU 24 calculates the relative position of slide operator 32 on scale 31 from the coordinates of slide operator 32 on scale 31 in display device 28. Referring to conversion table 300 in memory 23, slide operator position information 301 of the relative position of slide operator 32 is converted into a corresponding parameter value 302 in real time, which is displayed in parameter value display 30. When a pointing event is completed, the current parameter value 302 is displayed on parameter value display 30 as the rough value.

Operation of fine-adjustment of a parameter value will be described with reference to FIGS. 13B and 13C. When a pointing event is generated in response to the user depressing a button on the mouse or pen, or a return key on the keyboard when cursor 33 is located on either of fine-adjustment regions 34A and 34B on scale 31, the specified coordinates by cursor 33 at the time of generation of a pointing event in display device 28 is detected. The specified distance between the coordinates of slide operator 32 on scale 31 and the specified coordinates by cursor 33 is calculated by CPU 24 from the coordinates of scale 31 on display device 28 and the specified coordinates by cursor 33 at the time of a pointing event (generation) to obtain the specified distance information. CPU 24 refers to one of fine-adjustment tables 300A and 300B in memory 23 to convert the specified distance information into fine-adjustment granularity 500A (500B). This fine-adjustment granularity 500A (500B) is added to the current parameter (the parameter value displayed in display 30) to update the parameter value. One of fine-adjustment tables 300A and 300B is selected to refer to as set forth in the following. When a pointing event is generated in fine-adjustment region 34A, for example, table 300A storing negative fine-adjustment granularities 500A is used. Table 300B storing positive fine-adjustment granularities 500B is used when the pointing event is generated in fine-adjustment region 34B. It is natural that the fine-adjustment granularity is more critical than that of the parameter values 302 in conversion table 300 of FIG. 11.

When cursor 33 is moved using a mouse or a pen, or a cursor key on a keyboard while a pointing event is generated, i.e. while a button of the mouse or pen or the return key of the keyboard is depressed, specified distance information changes accordingly, whereby a corresponding fine-adjustment granularity 500A (500B) is added to the parameter value displayed in display 30 to be updated. The updated parameter value is displayed in real time for the user.

In order to indicate that fine-adjustment is carried out as shown in FIGS. 13B and 13C, a fine-adjustment rubber 35A or 35B is displayed between the center point of slide operator 32 and the pointing event generated position (position of cursor 33). More specifically, the fine-adjustment rubber is displayed between the coordinate position of slide operator 32 and the specified coordinate position by cursor 33.

Since the fine-adjustment granularity varies according to a change in the specified distance on the basis of the coordinate position of slide operator 32 and the specified coordinate position by cursor 33 to be expressed as a monotone increasing function of the specified distance, the fine-adjustment granularity becomes smaller as the specified coordinate position by cursor 33 approximates slide operator 32, and becomes greater as the specified coordinate position by cursor 33 becomes farther away from slide operator 32. In the present embodiment, this monotone increasing function is referred to as a fine-adjustment function.

Figure 14:
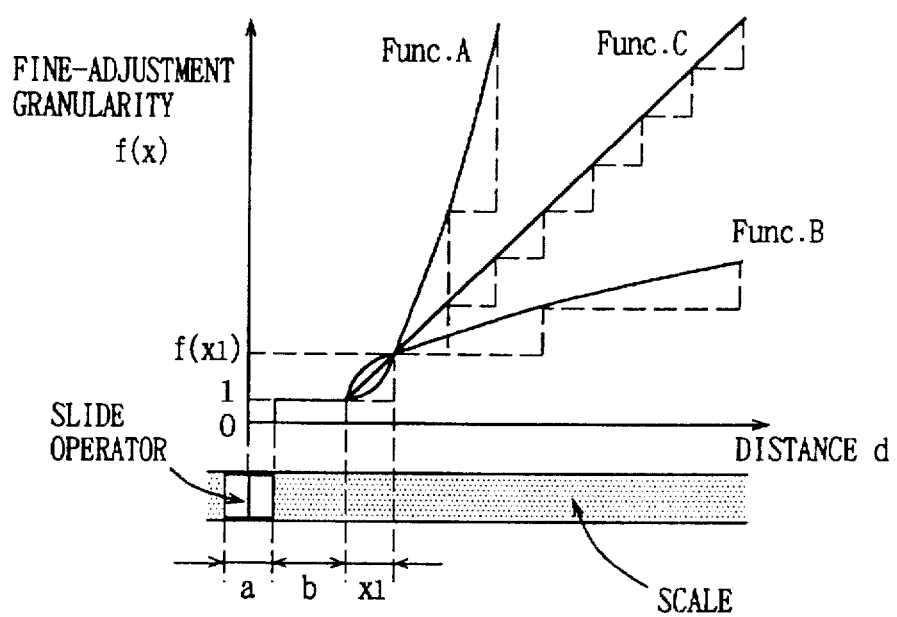
FIG. 14 shows a fine-adjustment function according to the second embodiment of the present invention.

FIG. 14 shows a fine-adjustment function according to the present second embodiment with the fine-adjustment granularity plotted along the ordinate, and the distance d plotted along the abscissa. The fine-adjustment function f (x) includes the following three functions, for example.

Func. A ... $f(x)=(k\cdot x)^2+1$

Func. B ... $f(x)=(k\cdot x)^{1/2}+1$

Func. C ... $f(x)=(k\cdot x)+1$ where k is an arbitrary constant, and x is an intermediate variable with respect to distance d between an arbitrary coordinate specified point in the fine-adjustment region and slide operator 32. Assuming that the lateral width of slide operator 32 is a, and the range of slide operator 32 where the fine-adjustment granularity is always 1 is b, x is expressed by the following equations.

When $d>(a/2+b)$ $x=d-(a/2+b)$

When $a/2<d\leq(a/2+b)$ $x=0$

When $0\leq d \leq a/2$ $x$=not intermediate variable

A region where the fine-adjustment granularity is always 1 is provided in a region from one end of slide operator 32 up to distance d for the purpose of improving the operability in the final stage of the fine-adjustment operation. By continuing selection of this region, fine-adjustment granularity 1 is slowly added to the parameter value by slide operator 32. Although the above-described fine-adjustment function is represented as a continuous function, it is actually represented as a stepped function since the distance d takes a discrete quantity. Fine-adjustment granularity 500A (500B) indicated by this stepped function is prestored in the memory corresponding to specified distance information 400A (400B). The most favorable fine-adjustment function was Func.C according to experiments by the inventor.

A case is described hereinafter where 10,000 titles of movies corresponding to a parameter value are retrieved. The scale length which is the movable region of slide operator 32 in scale 31 is set to 262 pixels. Therefore, approximately 38 titles of movies are allotted to every one pixel. The lateral width of slide operator 32 is set to 18 pixels. Applying the above-described fine-adjustment functions, k=1/10, and the intersection point of the above three functions is $x_1$=10 pixels for distance d and f $(x_1)$=2 items (titles) of the fine-adjustment granularity. The fine-adjustment granularity in the ordinate of the graph indicates how much the pointer is to be advanced corresponding to the data series of the movie titles. When a further critical fine-adjustment granularity is required, a position closer to slide operator 32 is to be input. Movie titles can be retrieved in a range of a more minute interval than that of a range specified by 1 pixel.

Figure 15:
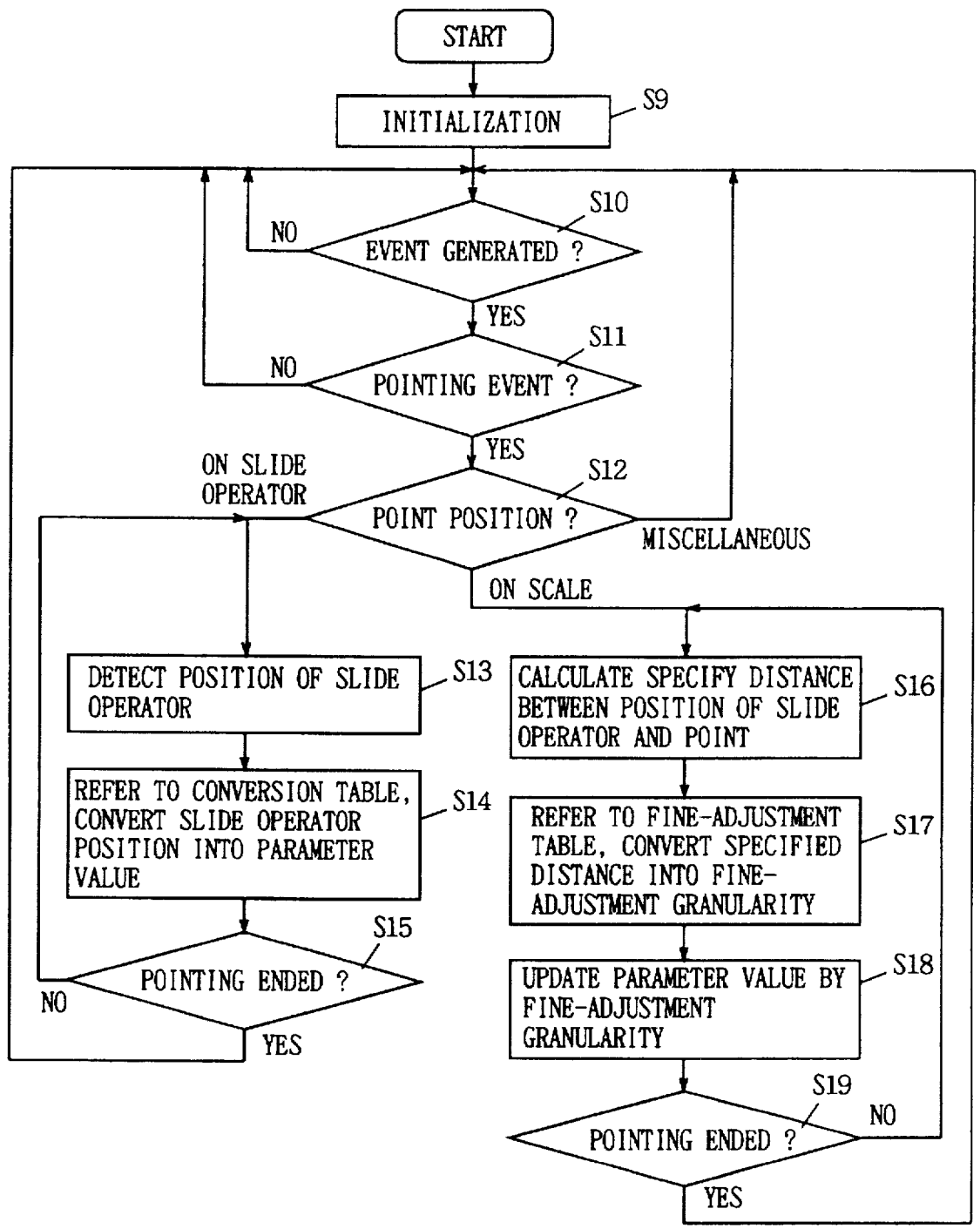
FIG. 15 is a flow chart showing a parameter setting procedure in the parameter processing device according to the second embodiment of the present invention.

The procedure of setting a parameter value according to the device of FIG. 9 will be described hereinafter with reference to the flow chart of FIG. 15.

This flow chart is prestored in memory 23 as a program to be executed under control of CPU 24.

Figure 11:
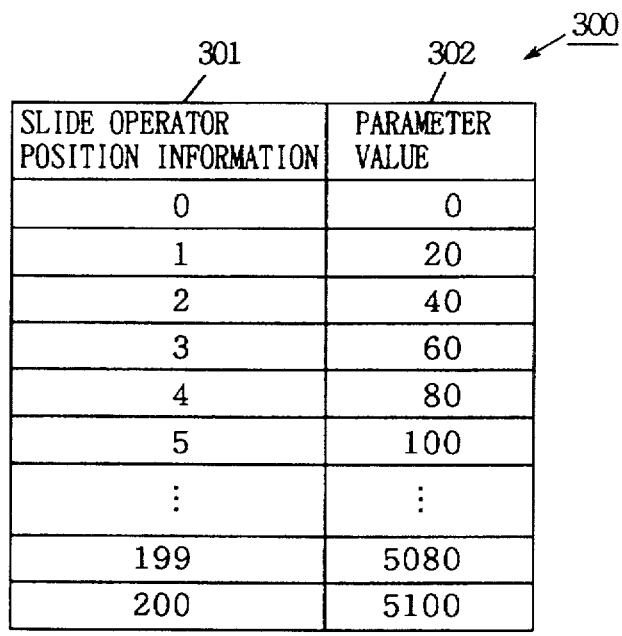
FIG. 11 shows a portion of the contents of a conversion table for converting position information of a slide operator on a scale into a parameter value according to the second embodiment of the present invention.

At step S9, initialization is carried out. In the initialization process, slide operator position information 301 is detected. Conversion table 300 of FIG. 11 is referred to, and the detected slide operator position information 301 is converted into a corresponding parameter value 302.

At step S10, determination is made whether an event is generated at the current point. When determination is made that no event is generated, step S10 is repeated (loop). This loop is continued until an event is generated.

When determination is made that an event is generated, the control proceeds to step S11 where determination is made whether the event is a pointing event or not. If not, the control returns to step S10 to wait for the generation of a subsequent event.

When determination is made that the generated event is a pointing event at step S1, the control proceeds to step S12 where the position of the generated pointing event is detected. When the position of the generated pointing event is not on slide operator 32, and also not in fine-adjustment regions 34A and 34B, determination is made that it is not a pointing event for setting a parameter value. The control returns to step S10 to wait for the generation of the next event. When the position of the generated pointing event is located on slide operator 32, the control proceeds to step S13. When the position is located on scale 31, i.e., located on either of fine-adjustment regions 34A and 34B, the control proceeds to step S16.

At step S13, slide operator position information 301 is detected again. At step S14, conversion table 300 shown in FIG. 11 is referred to, and the detected slide operator position information 301 is converted into a corresponding parameter value 302. The converted parameter value 302 is displayed on display 300 to be set.

At step S15, determination is made whether the pointing event has ended or not. If the pointing event has not yet ended, the control returns to step S13 to continue parameter setting by moving slide operator 32. If the pointing event has ended, the control returns to step S10 to wait for the next generation of an event.

At step S16, specified distance information is calculated by the coordinate position in fine-adjustment region 30A (30B) in which a pointing event has generated, and the coordinate position of slide operator 32.

At step S17, fine-adjustment table 300A (300B) is referred to, and specified distance information calculated at step S16 is converted into a corresponding fine-adjustment granularity 500A (500B).

At step S18, fine-adjustment granularity 500A (500B) obtained at step S17 is added to the current parameter value, whereby the parameter value is fine-adjusted and updated. The updated parameter value is displayed in display 30.

At step S19, determination is made whether the pointing event has ended or not. If not, the control returns to step S16 to continue fine-adjustment of a parameter value. If the pointing event has ended, the control returns to step S10 to wait for the next generation of an event.

Although the above-described parameter processing devices 100, 300 and 1000 may have the parameter value fine-adjusted in both the positive and negative directions, fine-adjustment may be carried out in one of the two directions.

According to parameter processing device 1000, a fine parameter value can easily be set that was not previously possible just by moving a slide operator. Setting a parameter value having a wide range can readily be carried out in a limited region.

According to parameter processing 100, the user setting a parameter value can fine-adjust the parameter value by depressing fine-adjustment switch 3A or 3B. Therefore, fine-adjustment and setting of a parameter can be carried out more intuitively.

According to parameter processing device 1000, fine-adjustment and setting of a parameter value can be carried out easily and at real time even when the display portion is limited such as in a portable information processing terminal device.

By presetting a fine-adjustment granularity of a parameter value in correspondence with a pixel granularity, a parameter value can be set even in the level of pixels below that of the display portion.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A parameter processing device for sequentially entering and providing a parameter value to be adjusted, comprising:
    display means for displaying at least a scale of a predetermined length and a slide operator movable on said scale,
    designation input means for entering designation of position information of said slide operator on said scale, and fine-adjustment position information for fine-adjusting said parameter value,
    detection means for detecting said designated input of said slide operator position information and said fine-adjustment position information,
    parameter value conversion means for converting said detected slide operator position information into a corresponding parameter value,
    fine-adjustment granularity conversion means for converting distance information of said detected slide operator position information and said fine-adjustment position information into a corresponding fine-adjustment granularity of said parameter value, and
    adjustment means for adjusting said parameter value from said parameter value conversion means using said fine-adjustment granularity from said fine-adjustment granularity conversion means, wherein variation in fine-adjustment granularity corresponds to a shifted amount of a cursor according to said distance information of said detected slide operator and said cursor on said scale.

2. The parameter processing device according to claim 1, wherein said parameter value conversion means comprises
    a parameter value conversion table having a plurality of said slide operator position information and corresponding plurality of said parameter values stored therein, and
    means for reading out said parameter value corresponding to said detected slide operator position information from said parameter value conversion table.

3. The parameter processing device according to claim 2, wherein
    said fine-adjustment position information comprises one of first fine-adjustment position information in a first region between said slide operator on said scale and one end of said scale in a longitudinal direction and second fine-adjustment position information in a second region between said slide operator on said scale and another end of said scale in the longitudinal direction,
    said distance information comprises one of first distance information by said slide operator position information and said first fine-adjustment position information, and second distance information by said slide operator position information and said second fine-adjustment position information, and
    said fine-adjustment granularity comprises one of a positive fine-adjustment granularity corresponding to said first distance information for fine-adjustment to increase said parameter value and a negative fine-adjustment granularity corresponding to said second distance information for fine-adjustment to decrease said parameter value.

4. The parameter processing device according to claim 3, wherein said fine-adjustment granularity conversion means comprises
    a positive adjustment granularity conversion table having a plurality of said positive fine-adjustment granularities and corresponding plurality of said first distance information stored therein, a negative adjustment granularity conversion table having a plurality of said negative fine-adjustment granularities and corresponding plurality of said second distance information stored therein, and means for reading out one of said positive fine-adjustment granularity and said negative fine-adjustment granularity corresponding to one of said detected first and second distance information from one of said positive and negative adjustment granularity conversion tables.

5. The parameter processing device according to claim 4, wherein respective said positive and negative adjustment granularity conversion tables are set so that respective corresponding positive and negative fine-adjustment granularities are increased as a distance to said slide operator in said first region indicated by said first distance information and a distance to said slide operator in said second region indicated by said second distance information are increased.

6. The parameter processing device according to claim 1, wherein said fine-adjustment position information comprises one of first fine-adjustment position information in a first region between said slide operator on said scale and one end of said scale in a longitudinal direction and second fine-adjustment position information in a second region between said slide operator on said scale and another end of said scale in the longitudinal direction, said distance information comprises one of first distance information by said slide operator position information and said first fine-adjustment position information, and second distance information by said slide operator position information and said second fine-adjustment position information, and said fine-adjustment granularity comprises one of a positive fine-adjustment granularity corresponding to said first distance information for fine-adjustment to increase said parameter value and a negative fine-adjustment granularity corresponding to said second distance information for fine-adjustment to decrease said parameter value.

7. The parameter processing device according to claim 6, wherein said fine-adjustment granularity conversion means comprises a positive adjustment granularity conversion table having a plurality of said positive fine-adjustment granularities and corresponding plurality of said first distance information stored therein, a negative adjustment granularity conversion table having a plurality of said negative fine-adjustment granularities and corresponding plurality of said second distance information stored therein, and means for reading out one of said positive fine-adjustment granularity and said negative fine-adjustment granularity corresponding to one of said detected first and second distance information from one of said positive and negative adjustment granularity conversion tables.

8. The parameter processing device according to claim 7, wherein respective said positive and negative adjustment granularity conversion tables are set so that respective corresponding positive and negative fine-adjustment granularities are increased as a distance to said slide operator in said first region indicated by said first distance information and a distance to said slide operator in said second region indicated by said second distance information are increased.

* * * * *